THERMOELECTRIC TRANSLATING DEVICE

Filed Jan. 6, 1950 2 Sheets-Sheet 1

INVENTORS: W. E. KOCK
L. G. SCHIMPF
BY Martha G. Pugh
AGENT

INVENTORS: W.E. KOCK
L. G. SCHIMPF
BY Martha G. Pugh
AGENT

Patented Aug. 11, 1953 2,648,823

UNITED STATES PATENT OFFICE 2,648,823

THERMOELECTRIC TRANSLATION DEVICE

Winston E. Kock, Basking Ridge, and Luther G. Schimpf, New Providence, N. J., assignors to Bell Telephone Laboratories, Incorporated, New York, N. Y., a corporation of New York Application January 6, 1950, Serial No. 137,206

20 Claims. (Cl. 332—4)

This invention relates in general to electrical energy translation, and more particularly to electrical signal amplification.

The broad object of the present invention is to provide an improved type of active element for use in the many applications involving the amplification of electrical energy; and more specifically to provide amplifier units which are compact and more easily fabricated and which have lower noise levels than those of the prior art.

The present invention provides an amplifier which makes use of the abrupt radical change in dielectric constant with temperature which occurs near the Curie point in a group of materials known as ferroelectrics, of which barium titanate is a specific example. Each of the disclosed embodiments employs as its active element a condenser comprising barium titanate as its dielectric material, connected in circuit relation with an alternating-current source of energizing power and a load.

The barium titanate is thermally biased to a selected temperature near its Curie point. Signals are applied so as to vary the temperature of the barium titanate, specifically by means of a heat unit thermally coupled thereto.

In accordance with one of the disclosed embodiments, the heating coil is connected through a circuit independent of the energizing circuit to a source of input signal current. The output current derived across the load circuit comprises alternating current from the energizing source modulated in accordance with a highly amplified replica of the input signal. If rectifying and filtering elements are added to the circuit, the output signal derived across the load is an amplified version of the input signal.

As in the case of other amplifying devices, such as the vacuum tube and the transistor, the amplifying element of the present invention can be applied in numerous different circuit configurations.

In accordance with a second disclosed embodiment, a sine wave oscillator is provided by a regenerative tuned feedback connection between the output terminals of the amplifier and the input heating coil.

Another disclosed modification of the present invention is a trigger circuit in which rectified output from the barium-titanate unit is fed back into the input heating coil in series with biasing current from a controlled direct-current source. As soon as the biasing current is raised above a certain critical value, the output current through the barium-titanate unit rises to a relatively high value, at which it remains stabilized until the biasing current is reduced below a second lower critical value.

Other objects, features and advantages of the present invention will be apparent from a study of the specification hereinafter and the attached drawings, of which:

Barium titanate is one of a group of materials known as ferroelectrics. Most of these materials have a dielectric constant several orders of magnitude higher than that of ordinary dielectrics. Barium titanate, for example, has a dielectric constant of about 1200 at room temperatures, whereas dielectrics such as mica and glass have dielectric constants between 5 and 10.

In the case of ordinary dielectrics, there is usually a gradual change of dielectric constant with temperature. This may be either in a positive or negative direction. However, in the case of ferroelectrics, the dielectric constant undergoes an abrupt, radical change in dielectric constant at certain temperatures which is associated with a change in the crystal structure of the material. In the case of barium titanate, one transitional point is located in the neighborhood of 120° C. As will be discussed in detail hereinafter, amplifier action in accordance with the present invention is obtained by operating at this particular transition point with a unit comprising barium titanate. At temperatures above this point, barium titanate acts as an ordinary dielectric with a negative dielectric-constant temperature characteristic, whereas at temperatures below the transitional or Curie temperature the crystal structure is changed, and the dielectric constant changes rapidly in a negative direction over a temperature range of a few degrees centigrade. After this abrupt change, the dielectric constant changes little as the temperature is lowered, although a minor transition occurs at 0° C. and another at −60° C.

At temperatures below 120° C., barium titanate is a ferroelectric material. As such, it shows a hysteresis loop as the voltage is varied on the plates of a condenser in which it is included as a dielectric; thus the electric displacement vector does not have the same values after the voltage applied is decreased from a maximum, as was obtained as the voltage was increased from zero. This is analogous to the better known hysteresis loop obtained in the case of ferromagnetic materials. Thus when the voltage is reduced to zero, the electric displacement vector is not zero, causing a permanent polarization to remain which is analogous to the permanent magnetization in the case of ferromagnetic materials. In a manner similar to the magnetic case, in which mechanical motion can be produced by applying a magnetic field to a ferromagnetic substance, it is possible to produce mechanical motion in a ferroelectric body by applying an electric field thereto. Inasmuch as this invention depends upon the rapid change of dielectric constant with temperature, this aspect of ferroelectrics will be considered in more detail with particular emphasis on barium titanate, which will be utilized as the active material in the illustrative embodiments to be described hereinafter.

Figure 1:
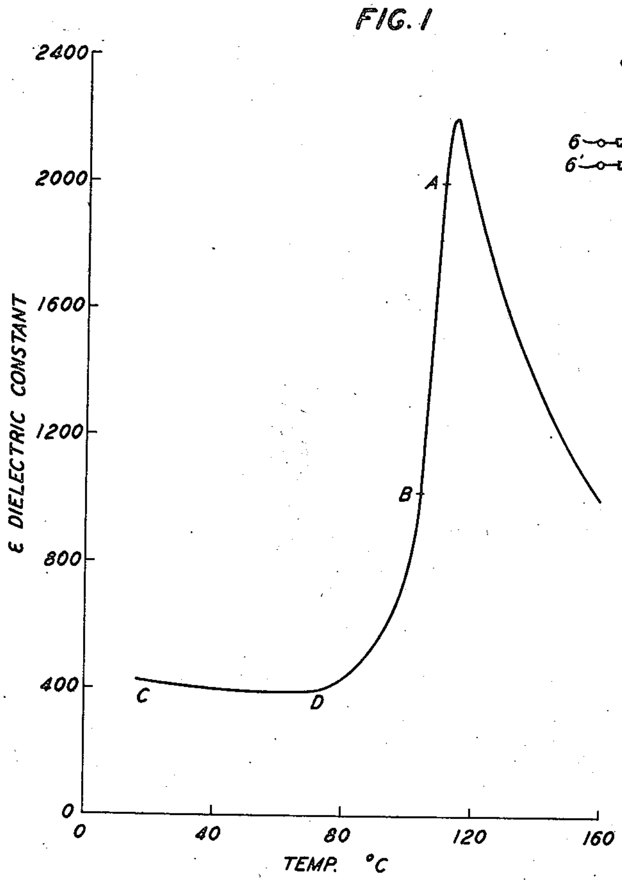
Fig. 1 shows a typical dielectric constant versus temperature curve for barium titanate.

A typical curve of temperature versus dielectric constant for barium titanate is shown on Fig. 1. It will be noted that the dielectric constant changes very little from 30° C. to 90° C. At 90° C., the dielectric constant begins to increase, and in the region between 105° C. and 110° C., the increase is very rapid. At the Curie point, which occurs at a temperature of 115° C. in the particular sample considered, the internal structure is changed thereby causing the dielectric constant to decrease with further temperature increases. This, as stated above, is a typical temperature versus dielectric-constant curve for barium titanate. Although other samples may have a slightly different shaped curve in which the transition point occurs at a somewhat lower or higher temperature, the rapid increase in dielectric constant just below the transition point occurs in all cases.

There are ferroelectric materials other than barium titanate which exhibit many of the same properties. Rochelle salts and ammonium dyhydrogen phosphate are two others of this general class of materials. They each have a high dielectric constant, the value of which goes through sudden changes as the temperature is varied. However, the dielectric constant is not as large as that for barium titanate, nor is the temperature-dielectric constant change as rapid. For this reason, barium titanate was chosen as the dielectric material for embodiments disclosed, although other ferroelectric materials may be found to be more suitable.

The units which will be utilized in the embodiments described hereinafter can be prepared in a manner well known in the ceramics art. Thus, commercially obtainable powder comprising amorphous barium titanate is mixed with a suitable ceramic binder such as paraffin and pressed into the form of a small disc. There are numerous other such binders which can be used. The disc is then placed in an oven and fired at a temperature of 1350° C. This process forms a small ceramic disc of barium titanate, and is not different from the process used to prepare other ceramics. A unit with a somewhat sharper rise of dielectric constant with temperature at the transition point can be obtained by grinding up individual crystals of barium titanate and forming them into a ceramic as described above. It is also possible to use the individual crystals without forming a ceramic, inasmuch as they also show an abrupt temperature-dielectric constant curve.

Barium-titanate material of the above description is then utilized as the dielectric material for a condenser, the electrodes of which comprise thin platings of the order of .01 to 0.1 millimeter thick on opposite faces of the ceramic disc or crystal.

Amplifier action entails heating such a unit to a temperature which is on the steep portion of the temperature-dielectric constant curve. One method of doing this is to use an electric heater which is in close constant with the unit, such as indicated int he several forms respectively shown in Figs. 2A, B and C.

The illustrative embodiment shown in Fig. 2A, which will now be described in detail, comprises a disc of barium titanate having a heating unit comprising a tightly wound insulated heating coil. A disc 1 of barium titanate, which may, for example, have a diameter of 1 to 5 millimeters, and which is prepared in the manner described hereinbefore, has electrodes comprising conducting coatings 2, 2′ of silver or similar conducting material plated on its opposite faces, and terminating in connections 6, 6′. The condenser unit is wound with a coil 3 of the order of 10 turns of 44 gauge high resistance wire comprising Nichrome, or similar material, upon which has been extruded an insulating coating 5, and which terminates in the connection 4, 4′.

If a source of current is connected to the terminals 4, 4′ of the heating coil 3, the heat resulting from the flow of current therethrough will heat the barium-titanate disc. By adjusting the current to the proper value, the disc can be maintained at a temperature on the steep portion of the dielectric constant-temperature curve.

Figure 2A:
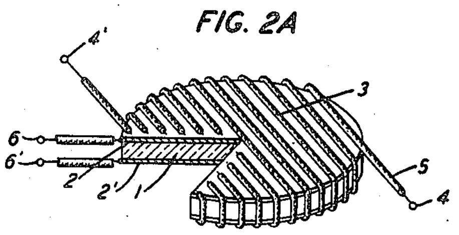
Fig. 2A shows a sectionated view of one type of barium-titanate amplifier element comprising a condenser having a ceramic disc as dielectric, upon which is superposed a wound-wire heating coil.
Figure 2B:
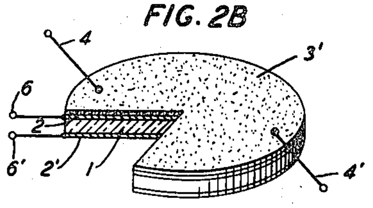
Fig. 2B shows a sectionated view of a second type of barium-titanate amplifier element which comprises a condenser including a ceramic disc dielectric, one surface of which is coated with a resistive layer such as carbon.

Another type of heater in actual contact with the ferroelectric material is shown in Fig. 2B of the drawings. In this embodiment, a layer 3′ of carbon or other high resistance conductor approximately 0.1-millimeter thick is superposed on top of the conducting electrode coating 2 on one surface of the ceramic disc 1. The electrode coatings 2, 2′ are of similar character to those described hereinbefore with reference to Fig. 2*a*, and terminate in connections 6, 6′. Since the carbon surface 3′ has a high electrical resistance, a source of current connected to the terminals 4, 4′ at opposite ends of the surface 3′ causes the unit to be heated in the same manner as described with reference to the wire heater.

Figure 2C:
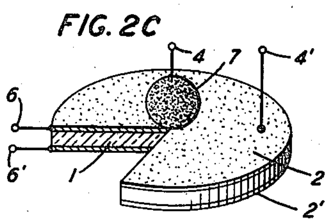
Fig. 2C shows a sectionated view of a third type of barium-titanate amplifier unit in which the heating unit comprises a carbon sphere in contact with one of the electrode surfaces of the ceramic disc condenser.

Still another type of unit is shown in Fig. 2C of the drawings, wherein heat is supplied through a carbon sphere 7 of the order of .05 millimeter in diameter, which is applied to the electrode coating 2 on one surface of the ceramic 1. Terminals 4, 4', respectively connected to the carbon sphere 7 and the coating 2, are provided for connecting the unit to the heating circuit. As in the previously described units, condenser connections to the electrode coatings 2, 2' are furnished by the terminals 6, 6'.

In operation, heating current flows through the carbon sphere 7 causing its temperature to rise, the resultant heat being transferred to the ceramic disc 1. By proper control of the current flow through the sphere 7, the barium-titanate unit can be operated on the steep portion of the temperature-dielectric constant curve.

As pointed out in the foregoing portions of the specification, alternative units can be constructed in which either a single large crystal of barium titanate or a large number of small crystals are substituted for the ceramic disc shown in Fig. 2A, B and C.

Inasmuch as the dimensions of the units indicated are small, the heating cycle will follow rapid electric current changes through the heater units, that is, at least for frequencies through the audio band.

Figure 3:
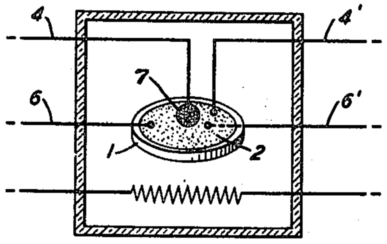
Fig. 3 shows a modified form of amplifier element in which the biasing temperature is applied by means of an oven having an external heating unit.

In accordance with a further modification of the amplifier unit, the thermal bias may be supplied indirectly, by incorportating any one of the units shown in Figs. 2A, B and C in an indirectly heated oven, as indicated in Fig. 3. In this case, the oven is raised to a temperature on the steep portion of the dielectric-constant-temperature curve. The source 14 of biasing current is omitted in the circuit connected to the heating unit, which then functions only to supply variations in the temperature in accordance with signal variations.

The amplifier unit, in its various modifications, as described in the foregoing paragraphs, is adaptable for use in numerous different types of circuit configurations, several of which will be described hereinafter.

Figure 4:
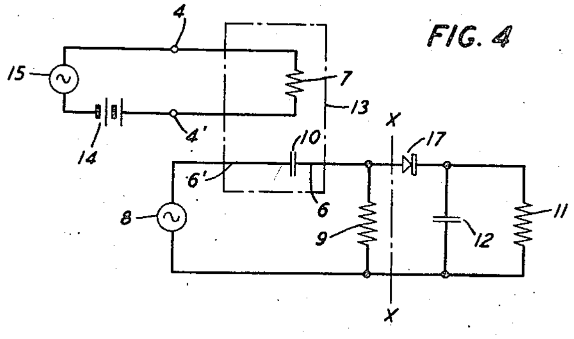
Fig. 4 is a schematic diagram of an amplifier circuit in accordance with the present invention.

One of the simplest and most fundamental circuit forms is the amplifier modulator shown to the left of the dotted line X—X' in Fig. 4 of the drawings. This circuit includes an amplifier unit described with reference to Fig. 2C, although it is apparent that any of the other forms described could be substituted. As described hereinbefore, the terminals 6, 6' have been placed in contact with the conducting layers 2, 2' on the barium-titanate disc 1 in such a manner as to form a condenser 10 which utilizes this material as a dielectric. Connection is made to the upper conducting surface 2 by means of the wire 6, whereas a similar connection is made through wire 6' to the lower surface 2'. As indicated in Fig. 4, a source of alternating-current power 8 of, for example 0.5 volt, is connected to terminal 6. Terminal 6' is connected to the 1000-ohm resistance 9, so as to form a series circuit consisting of the alternating-current source 8, the barium-titanate condenser 10, and resistance 9. The input circuit, which includes the direct-current biasing source 14 in series with the signal source 15, is connected across the heater terminals 4, 4' to the barium-titanate amplifier unit, shown in detail in Fig. 2C.

If the temperature is low, it will be noted from the curve shown on Fig. 1, that the capacity of the condenser 1 will be low, and hence its impedance will be high. Therefore, most of the voltage drop in the series circuit including the source 8, resistance 9, and condenser 10 will occur across the condenser, causing the voltage drop across the resistance 9 to be low. If the source of direct current 14 in the input circuit is adjusted to the proper value, the temperature of the barium titanate will be raised by the heater 7 until it operates on the steep linear portion of the dielectric-constant-temperature curve indicated, for example, between the letters A and B on the curve of Fig. 1, whereupon the capacity of the condenser 10 is considerably increased above its low temperature value. Hence, the alternating-current voltage drop across the condenser 10 will have decreased, and a greater proportion of the alternating-current voltage from the source 8 will appear across resistance 9. It is apparent from the above consideration that variations in temperature of the dielectric material of condenser 10 cause substantially linear variations in output, such that the alternating-current voltage from the source 8 appearing across resistance 9 is modulated in accordance with a greatly amplified replica of the signal current impressed on the circuit of the heater 7.

If the circuit of Fig. 4 is extended, as indicated to the right of the line X—X', to include the rectifier 17 in series with the high voltage terminal of the condenser 10, the load resistance 11 connected to receive the rectified output current, and the condenser 12 connected in shunt across the output resistance 11 to filter out the alternating-current components due to the energizing source 8, the circuit is converted into an amplifier circuit which operates as follows.

Alternating current from the signal source 15 is superimposed on the direct current from the source 14, whereby the heat supplied to the condenser 10 from the heater 7 causes the temperature of the dielectric material to increase and decrease around its steady value in accordance with the applied input signal. When the alternating current from the signal source 15 is in such a direction as to aid the voltage from the source 14, the barium-titanate condenser 10 will increase in temperature from its nominal value determined by the direct-current bias. Thus, as pointed out hereinbefore, the impedance of the condenser 10 decreases, due to the fact that the dielectric constant increases with temperature as shown by Fig. 1. The voltage across resistance 9 will then rise, which in turn causes an increase in output voltage across load resistance 11. When the current from source 15 is in such a direction as to oppose the current from source 14, the temperature of the barium-titanate condenser 10 will be decreased. As shown on Fig. 1, and as discussed above, this causes a decrease of capacitance and hence less voltage appears across resistance 9 because of the increased voltage drop across the condenser. Accordingly, the output voltage received in the resistance 11 will also decrease. If the bias is set at such value that it operates on the steep linear portion of the dielectric-constant-temperature curve, as indicated between letters A and B on Fig. 1, and if the frequency and amplitude of the signal from source 15 are within the operating range of the particular barium-titanate unit used, the output voltage across the load resistance 11 will be an amplified signal of the voltage from source 15.

Figure 5:
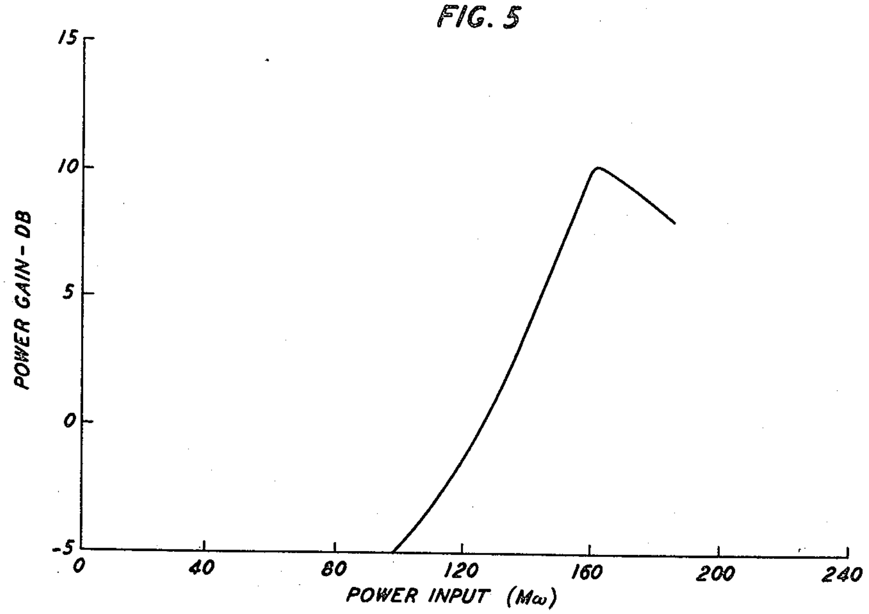
Fig. 5 is a graphical representation of the power gain for various values of direct-current bias applied to the amplifier circuit of Fig. 4.

Fig. 5 shows curves indicating the power gain for various values of direct-current bias. When the bias is such that the unit is operating on the flat portion as indicated between letters C and D on the curve of Fig. 1, a loss is obtained. As the bias is increased correspondingly increasing the temperature of the unit to an operating point on the steep portion of the curve, the gain increases. The gain continues to increase until a maximum is reached at the steepest portion of the curve. As the transitional temperature is reached, the gain decreases as the slope decreases. The amplitude operating range is preferably within the steep portion indicated between A and B on the temperature-dielectric-constant curve, although it is possible that satisfactory operating positions may be found on other portions of the curve, for example, the decreasing slope beyond the Curie or transitional point. The frequency range is preferably such that the temperature of the unit, including the heater, will follow the input current. It has been found that a power gain of 10 decibels can be obtained with a unit including a ceramic disc dielectric.

Figure 6:
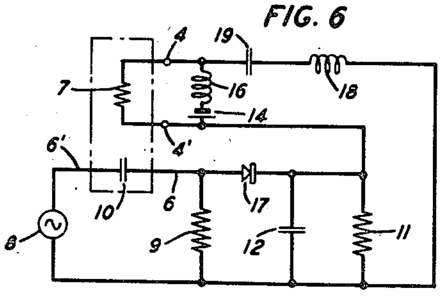
Fig. 6 is a schematic diagram of one form of sine wave oscillator utilizing the active element of the present invention.

The amplifier circuit described with reference to Fig. 4 can be modified to form an oscillator by coupling the input heater circuit to the output terminals, instead of to an independent signal source. Such an oscillation generator, which employs as its active element one of the barium-titanate units described with reference to Fig. 2C, is shown schematically in Fig. 6. As in the previously described embodiments, the condenser 10 is biased to the proper operating temperature by the direct-current source of power 14. The terminals 4, 4' of the heater 7 are connected to the 10,000-ohm output resistance 11 through condenser 19 and inductance coil 18. The 10-henry choke coil 16 serves to prevent a short circuit of the alternating-current flowing through the heater 7, condenser 19, coil 18 and resistance 11. The resistance 9, rectifier 17 and condenser 12, are connected in a similar manner and serve the same purposes as in the previously described embodiment.

In operation, the biasing current from source 14 is adjusted to bring the unit 1 up to the proper operating temperature, in the manner described. If there is a small disturbance in the current through the heater 7 in such a direction as to increase the current flow therein, the temperature of condenser unit 10 will increase by a small amount. As described in the previous section, an amplified version of this signal will appear across resistance 11. This will cause still more current to flow through the heater 7, producing an action which is cumulative, until the gain of the unit drops to unity as the transition temperature is reached, limiting the output in the positive direction. As the output levels off, the energy stored in condenser 19 and inductance 18, causes the current through the heater 7 to reverse, thereby cooling the condenser unit 10, whereupon the output across resistance 11 decreases. Thus, the circuit generates oscillations, the frequency of which is determined by the respective values of the condenser 19 and the inductance 18 in the feedback circuit.

Figure 7:
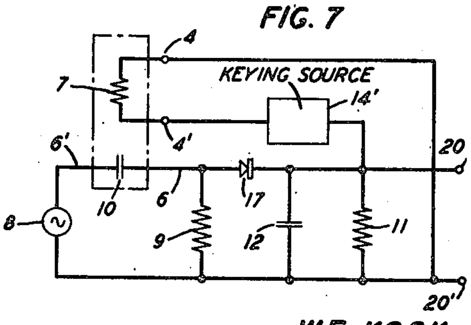
Fig. 7 is a schematic diagram of a trigger circuit utilizing the active element of the present invention.

In Fig. 7 is shown a further modification of the amplifier circuit described with reference to Fig. 4, comprising a trigger or switching circuit employing as its active element a condenser having barium titanate as its dielectric material, and a heating means such as previously described. This circuit fulfills a somewhat similar function to prior art circuits including gas-filled tubes, and may be used to operate relays and switches, to provide shaped pulses, and in many other diverse applications.

The basic circuit elements and their connections, including the barium-titanate condenser 10 having condenser connections 6, 6', heater 7 and heater connections 4, 4' the alternating-current energizing source 8, resistance 9, rectifier 17, filter condenser 12, and load resistance 11, are all similar to those described with reference to previous embodiments. Connection is made for feeding output current derived from the load circuit 11 to the heater 7 across the terminals 4, 4' through a circuit which includes a keying source 14' in series connection. The source 14' may comprise a simple source of manually variable direct-current potential, such as a battery across which is connected a potential divider, or any type of periodically varying control potential to key the operation of the trigger circuit.

The circuit operates in the following manner. As the direct-current power from the source 14 is increased, the temperature of the condenser 10 will increase because of the action of the heater 7. As the steep portion of the temperature-dielectric-constant curve is reached, the change in power output across the load 11 will be greater than the power change required from the source 14 to produce this change. Hence there is a net gain between terminals 4, 4' and resistance 11. Inasmuch as the output power derived from the load resistance 11 is added to the power applied by the triggering source 14 and fed into the input, the circuit rises sharply to a high value as soon as the total bias applied by the source 14 increases to a point at which the net gain is greater than unity, stabilizing its operation at a point near the Curie point or transitional temperature on the dielectric-constant-temperature curve. Thus, a relatively high, steady voltage output is obtained across the output terminals 20, 20' as long as the biasing voltage from the triggering source 14 is such as to maintain the barium titanate above the critical temperature producing a voltage gain of greater than unity across the load 11.

In order to reset the circuit, the power from the biasing source 14 must be reduced to a point at which the unit begins to cool. The circuit will then return to a stable condition of low output current, operating near the bottom of the sharp dielectric-constant-temperature curve.

Although a load resistance 11 is shown in all cases, it is to be understood that a reactance or an impedance consisting of reactance and resistance can be used in the output. In some cases it may be desirable to obtain a frequency selective amplifier by using a parallel tuned circuit as the output load. In order to obtain gain, the impedance of the load should preferably be about equal to or higher than the value of resistance 9.

It will be apparent that practice of the present invention is not confined to use of the particular elements or combinations of elements disclosed herein by way of illustration.

What is claimed is:

1. In combination, a body of ferroelectric material, a pair of electrodes dielectrically coupled through said body, means for maintaining said body thermally biased to a temperature within a substantially linear range of variations on the steep, linear portion of the dielectric constant-temperature characteristic near a transition temperature of said material, and an electrical heater in heat transfer relation with said body for varying the temperature of said material within said range in accordance with impressed signal currents.

2. A circuit element comprising a matrix of ferroelectric material wound about with a heating coil comprising insulated high resistance wire.

3. A circuit element in accordance with claim 2 in which said ferroelectric material comprises barium titanate.

4. A circuit element comprising a matrix of ferroelectric material having at least a partial coating of a high resistance conducting material, and a pair of electrodes in contact with said coating.

5. A circuit element in accordance with claim 4 in which said ferroelectric material comprises barium titanate.

6. A circuit element in accordance with claim 4 in which said high resistance material comprises carbon.

7. A circuit element comprising a matrix of ferroelectric material having at least a partial coating of a highly conducting material, a first electrode in contact with said coating, and a second electrode comprising substantially a sphere of high resistance conducting material.

8. A circuit element in accordance with claim 7 in which said ferroelectric material comprises barium titanate.

9. A circuit element in accordance with claim 7 in which said high resistance conducting material comprises carbon.

10. A circuit for amplitude modulation and amplification of impressed signals comprising in combination a capacitative element comprising as its dielectric a ferroelectric material, an energizing source, and a load circuit having a smooth impedance characteristic over a wide range of signal frequencies connected in series circuit relation with said capacitative element, a signal source, and means comprising an electrical heater in circuit relation with said signal source and in heat transfer relation with said ferroelectric material for varying the temperature of said material in accordance with impressed signal currents from said signal source.

11. A circuit comprising in combination a capacitative element comprising as its dielectric a ferroelectric material, an energizing source of constant-frequency carrier waves, and a load circuit connected in series circuit relation with said capacitative element, a signal source, means for thermally biasing said dielectric material to a temperature near its Curie point, and an electrical heater in circuit relation with said signal source and in heat transfer relation with said ferroelectric material for varying the temperature of said material in accordance with impressed signal currents from said signal source.

12. A circuit in accordance with claim 11 in which said means for thermally biasing said material comprises an oven.

13. An amplifying and modulating circuit comprising as its active element a condenser comprising a pair of electrodes dielectrically coupled through a ferroelectric material, an energizing source, and a load circuit having a substantially resistive characteristic over a wide range of signal frequencies connected in circuit relation with said condenser through said electrodes, a signal source, and an independent circuit comprising an electrical heater disposed in heat transfer relation with said ferroelectric material and connected to said signal source for varying the temperature of said material in accordance with impressed signal currents.

14. An amplifying circuit comprising as its active element a condenser comprising a pair of electrodes dielectrically coupled through a ferroelectric material, an energizing source and a load circuit connected in circuit relation with said condenser through said electrodes, means for thermally biasing said ferroelectric material to a temperature within a substantially linear range of variations of said dielectric constant-temperature characteristic near its Curie point, a signal source, and an independent circuit comprising an electrical heater disposed in heat transfer relation with said ferroelectric material and connected to said signal source for varying the temperature of said material within said range in accordance with the impressed signal currents.

15. An amplifier-modulator circuit comprising as its active element a condenser comprising a pair of electrodes dielectrically coupled through a ferroelectric material, an alternating-current energizing source of substantially constant frequency and a load circuit connected in circuit relation with said condenser through said electrodes, means for thermally biasing said ferroelectric material to a temperature near its Curie point, a signal source, and an independent circuit comprising an electrical heater disposed in heat transfer relation with said ferroelectric material and connected to said signal source for varying the temperature of said material in accordance with the impressed signal currents.

16. An amplifier-modulator circuit comprising as its active element a condenser comprising a pair of electrodes dielectrically coupled through a ferroelectric material, an alternating-current energizing source and a load circuit connected in circuit relation with said condenser through said electrodes, means for thermally biasing said ferroelectric material to a temperature near its Curie point, a signal source, and an independent circuit comprising an electrical heater disposed in heat transfer relation with said ferroelectric material and connected to said signal source for varying the temperature of said material in accordance with the impressed signal currents, in which rectifying and filtering means are included between said condenser element and said load circuit for producing a rectified output current and for filtering out the alternating-current component due to said energizing source.

17. An oscillator circuit comprising as its active element a condenser comprising a pair of electrodes dielectrically coupled through a ferroelectric material, an alternating-current energizing source having a substantially constant frequency and a load circuit connected in circuit relation with said condenser through said electrodes, means for thermally biasing said ferroelectric material to a temperature near its Curie point, an electrical heater disposed in heat transfer relation with said ferroelectric material for varying the temperature of said material in accordance with variations in the current through said heater, and circuit means for impressing output energy from said load circuit on said electrical heater.

18. An oscillator circuit in accordance with claim 17 in which said circuit means for impressing output energy from said load circuit on said electrical heater includes elements tunable to a selected resonance frequency.

19. A trigger circuit comprising as its active element a condenser comprising a pair of electrodes dielectrically coupled through a ferroelectric material, an energizing source and a load circuit connected in circuit relation with said condenser through said electrodes, an electrical heater disposed in heat transfer relation with said ferroelectric material for varying the temperature of said material in accordance with variations in the current through said heater, circuit means for impressing output energy from said load circuit on said electrical heater circuit, and means for independently changing the thermal bias on said ferroelectric material from a temperature below a given critical temperature at which the ratio of output energy in said load circuit to input energy in said heater is less than unity to a temperature above said critical temperature, at which temperature said circuit becomes highly conducting.

20. In combination, a condenser comprising a pair of electrodes and an interposed body of ferroelectric material, a carrier wave source, a load connected in series circuit relation with said source and with said condenser, means for thermally biasing said ferroelectric material to a temperature near its Curie point, an electrical heater in heat transfer relation with said ferroelectric material, and means for applying modulating current to said heater for varying the temperature of said material.

WINSTON E. KOCK.
LUTHER G. SCHIMPF.

References Cited in the file of this patent

UNITED STATES PATENTS

| Number | Name | Date |
|---|---|---|
| 2,230,649 | Mason | Feb. 4, 1941 |
| 2,453,243 | Mason | Nov. 9, 1948 |
| 2,473,556 | Wiley | June 21, 1949 |
| 2,483,070 | Spindler | Sept. 27, 1949 |